July 19, 1966  J. G. SCHICK  3,261,217
DRIVE MEANS FOR ROLLER FEED MECHANISMS ON PRINTING, STAMPING
AND LIKE MACHINES
Original Filed Sept. 19, 1960  3 Sheets-Sheet 1

INVENTOR.
JOHANN GEORG SCHICK
BY

INVENTOR.
JOHANN GEORG SCHICK
BY

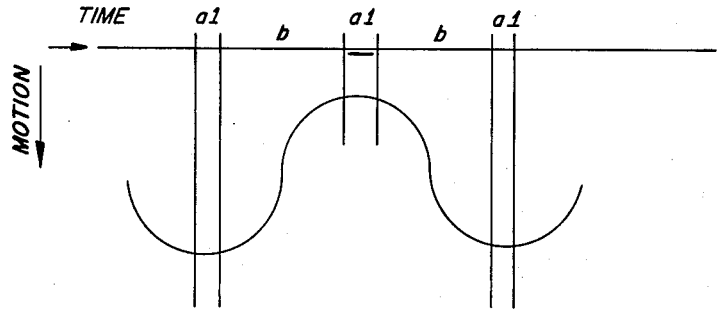
FIG. 4
FIG. 5
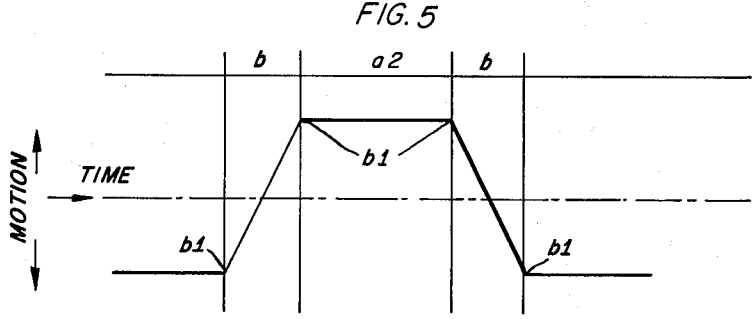
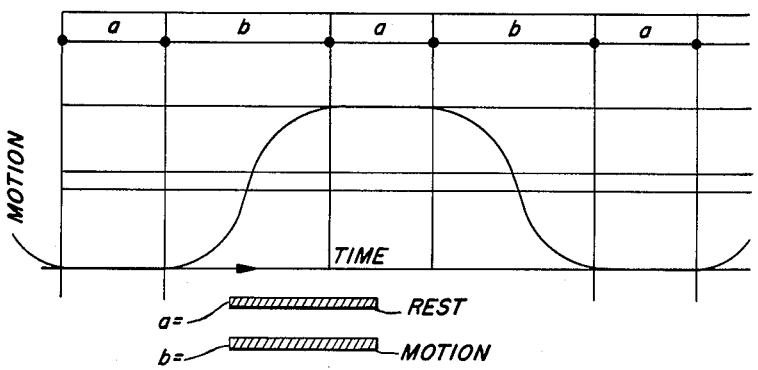
FIG. 6
INVENTOR
JOHANN GEORG SCHICK
ATTORNEYS

United States Patent Office 3,261,217
Patented July 19, 1966

1

3,261,217
DRIVE MEANS FOR ROLLER FEED MECHANISMS ON PRINTING, STAMPING AND LIKE MACHINES
Johann Georg Schick, St. Gallen, Switzerland, assignor to Ferdinand Ruesch Maschinen- und Waagenfabrik, St. Gallen, Switzerland
Continuation of application Ser. No. 57,059, Sept. 19, 1960. This application Jan. 10, 1964, Ser. No. 337,097
Claims priority, application Switzerland, Sept. 18, 1959, 78,409/59
1 Claim. (Cl. 74—84)

This invention relates to improvements in drive means for roller feed mechanism to intermittently advance web material, in particular on printing and stamping machines.

This application is a continuation application of my copending application Serial No. 57,059, filed September 19, 1960, now abandoned.

In printing presses or stamping or punching machines in which an endless or continuous web of material is to be treated or worked upon, the latter is fed advantageously step-by-step or intermittently and mainly between two transporting rollers for guiding and passing said material in a predetermined direction and extent.

The invention concerns more specifically drive means for both these transporting rollers, which are so arranged that intermittent movement of the transporting rollers is carried out at greatly reduced starting velocity and terminal speed.

During working of printed web materials it is desirable that the feed or transporting rollers for each working stroke perform a complete rotation in order to avoid doubling of the freshly treated material.

According to the invention, the transporting rolls are blocked or arrested after execution or performance of a complete revolution or rotative movement by a stop device, so that neither a forward run, nor after-movement or end run of the transporting rollers can take place.

It is, therefore, an important object of the invention to provide means affording high precision operation of the drive means of the aforesaid type.

These and other objects of the invention will become further apparent from the following detailed description, reference being made to the accompanying drawings, showing a preferred embodiment of the invention.

In the drawings:

FIG. 4 is a graphical illustration of a motion vs. time characteristic which is typical of one form of prior art intermittent motion mechanism;

FIG. 5 is a graphical illustration of a motion vs. time characteristic which is typical of another form of prior art intermittent motion mechanism; and FIG. 6 is a graphical illustration of a motion vs. time characteristic of the intermittent motion mechanism according to the present invention.

Figure 1:
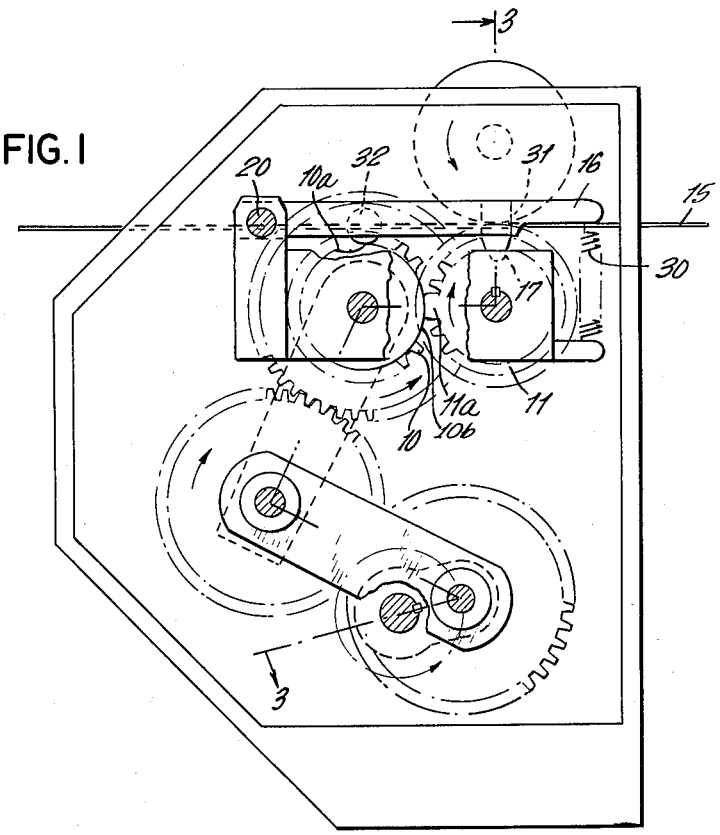
FIG. 1 is a side elevational view of the inventive drive system.

Referring now more particularly to the attached drawings, there is shown a drive system according to the invention including a three-wheeled gearing combined with

2 a restwheel or intermission gearing of the following construction:

As shown in the drawing figures, a crank gear 2 is suitably keyed to an end of a drive shaft 1 which is rotatable in a frame 50. As shown, the crank gear 2 is eccentrically mounted with respect to the drive shaft 1. As indicated in FIG. 3, the crank gear 2 has a hub portion thereof concentric with the drive shaft 1.

Figure 2:
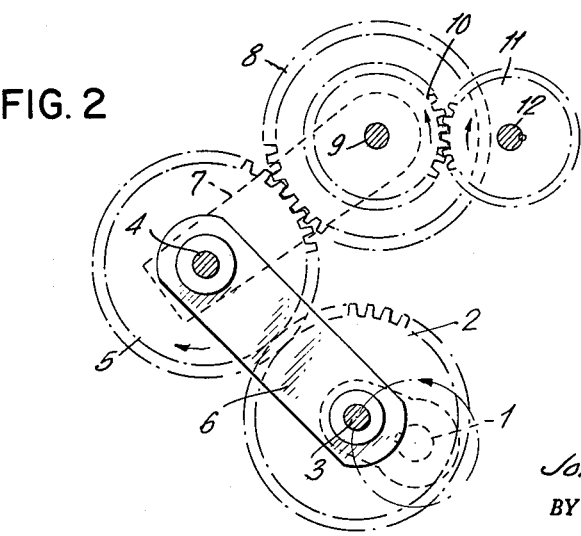
FIG. 2 is a plan view of a three-wheeled drive mechanism per se, as used in the system of FIG. 1.
Figure 3:
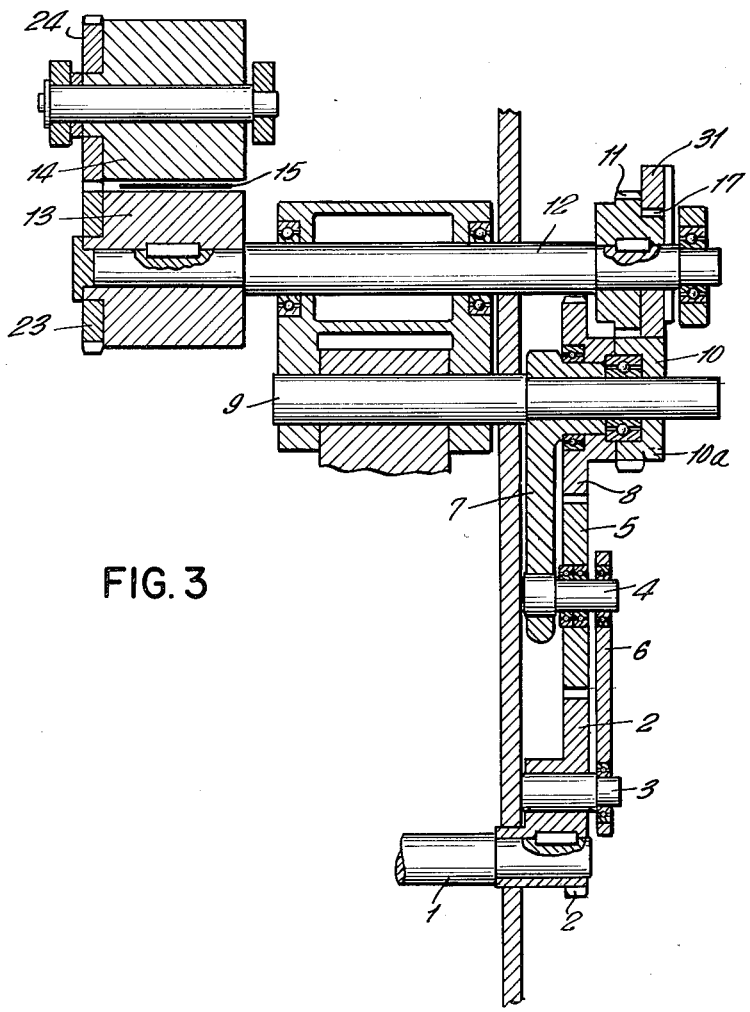
FIG. 3 is a vertical cross-section on an enlarged scale, the section being taken along line 3—3 of FIG. 1.

As shown at FIG. 3, a crank pin 3 extends through the crank gear 2; the crank pin 3, which is rotated about shaft 1, being indicated in FIG. 2. One end of the crank pin 3 is (as shown at FIG. 3) in sliding rotative movement with respect to the surface of the frame 50. The other end of the crank pin 3 is suitably journalled by, for example, bearing means, through one end of the link 6.

A pivot pin, or stub shaft, 4 is journalled on link 6 for idling rotative movement and carries an intermediate gear 5 which meshes with gear 2. Also, the opposite end of the stub shaft 4 is affixed to one end of an oscillatable arm or rocker link 7.

The opposite end of the oscillating arm or rocker link 7 has formed therein a suitable shaped boss, or sleeve, as shown in FIG. 3. Protruding through an aperture in this boss of the rocker arm 7 is an idler shaft 9; the rocker arm 7 being free to move rotatively about the idler shaft 9. Suitably journalled by bearing means for rotation on the boss portion of the rocker link 7 is the drive gear wheel 8. The intermediate idler gear 5 has its gear teeth in meshing engagement with the gear teeth of the crank gear 2 and with the teeth of the drive gear wheel 8.

Also, freely mounted on the idler shaft 9 adjacent the drive wheel 8, and coupled with the gear wheel 8 is the idler gear 10, which, as indicated in FIG. 3, can, by virtue of suitable bearing means, rotate about the idler shaft 9.

The idler shaft, or pivot pin, 9 as shown protrudes through the fixed pillow block member 51, as well as through a suitably provided aperture in the mounting frame 50.

As shown at FIG. 3, a drive shaft 12 passing through a suitable aperture in the frame 50 and journalled for rotative movements by suitable bearings in the pillow block 51 has keyed to one end thereof the driven, or final, gear 11. At the other end of the drive shaft 12, there is keyed the transporting roller 13. Mounting above the transporting roller 13 is the companion transporting roller 14 which is suitably journalled for rotative movement. The rotation of the transporting roller 13 by rotation of the drive shaft 12 causes a rotative movement of the transporting roller 14 by virtue of the meshing engagement of the teeth of the crown gears 23 and 24 which are attached, respectively, at the ends of the transporting roller 13 and the transporting roller 14.

Web material 15 situated between the peripheral surfaces of the transporting rollers 13 and 14 is intermittently fed from left to right according to the orientation shown in FIG. 1.

As shown in FIGS. 1 and 3, there is provided a recess 10a in a cam surface integral with and adjacent the idler gear 10. Also as shown in FIG. 1, the driven gear 11 includes one enlarged tooth 11a thereon which is wider than the rest of the teeth on the gear 11. In addition, the tooth 11a has a greater height than the rest of the gear teeth of gear 11. Also, as may be appreciated by reference to FIG. 1, the gear 10 has a predetermined number of gear teeth missing therefrom defining a gap 10b.

Also, as indicated at FIGS. 1 and 3, the driven gear 11 includes a groove, or recess, 17 in a surface integral therewith and adjacent the toothed portion of the gear 11.

As shown at FIG. 1, there is an elongated lever 16 suitably mounted on the frame member by means of the pivot pin 20 extending through one end of the lever 16. Mounted on the lever 16 is a cam roller 32 which, as shown at FIG. 1, is arranged for rolling engagement in the cam surface adjacent to and integral with the gear 10; the cam roller 32 being also adapted, as indicated at FIG. 1, to move into the recess 10a in said cam surface. Also, as indicated at FIG. 1, there is situated near the other end of the lever 16, the protruding cam member 31 which is in contact with the rotating cam surface integral with and adjacent to the toothed portion of the gear 11. Moreover, this cam member 31 is adapted to be received in the groove, or recess, 17 provided in said cam surface. A biasing spring 30 is arranged, as shown at FIG. 1, to urge the lever 16 together with its attached cam roller 32 and cam member 31 toward the cam surfaces of the respective gears 10 and 11.

Shown at FIG. 4 is a graphical illustration showing the motion vs. time characteristic of one form of a typical prior art intermittent motion mechanism. As indicated, the characterizing feature of this mechanism which is a three wheel gearing mechanism, is such that a very short rest, or dwell, period, represented by the time period designated $a-1$, is achieved. In most instances this very short rest, or dwell, period $a-1$ is insufficient to enable the processing of the web material 15 such as by punching or printing upon it.

FIG. 5 shows a graphical illustration of the motion vs. time characteristic of another typical prior art intermittent motion mechanism. As may be appreciated from FIG. 5, abrupt changes of rotational velocities are imparted to the web material 15 by the use of such a mechanism. These abrupt changes are represented by the transition points $b-1$, which transition points are intermediate the time periods $b$ and $2-2$. The rest, or dwell, period $a-2$ being extremely long and occurring abruptly after the constant rotational velocity period represented by the time period $b$. As a result, enormous impact forces occur due to such intermittent and abrupt motion. Often the web material 15 is torn or, at least, it is folded. The maximum speed at which the web material 15 may be fed is seriously attenuated.

Shown at FIG. 6 is a graphical illustration of the motion, or advancing, or web material 15 versus time achieved by use of the intermittent feed mechanism according to the present invention. As shown, a smooth transition occurs between periods of motion $b$ and periods of rest, or dwell, $a$. Moreover, a relatively long dwell period $a$ can be achieved without abrupt transititions between periods of motion $b$ and period of rest, or dwell, $a$. As a result, the maximum speed at which the web material 15 can be fed is relatively high.

Operationally, the drive shaft 1 is intended to be driven at a constant number of revolutions per unit of time. As a result, the crank gear 2 is rotated and, as indicated at FIGS. 1 and 2, the crank pin 3 is circularly moved. The intermediate gear 5, being journaled for idling rotation on the stub shaft 4, is also rotated due to its meshing engagement with the teeth of the crank gear 2. Similarly, the gear wheel 8 being meshed for rotation with the intermediate idler gear 5 is rotated on the boss portion of the rocker arms 7. As indicated at FIGS. 1 and 2, the rocker arm 7 and the link 6 being journaled, as indicated, are free to oscillatably move as the crank gear 2, the intermediate gear 5 and the gear wheel 8 have their spatial positions changed due to movement of their mutually engaging teeth. As the gear wheel 8 rotates, so does the idler gear 10; rotation of the idler gear 10 imparting, finally, rotative movement to the driven, or final, gear 11.

When the drive shaft 1 is driven at a constant angular velocity, the movement of the other gears 2, 5, 8 and 10 depend primarily upon the eccentric arrangement of the crank pin 3 with respect to the longitudinal center line through the drive shaft 1. The ultimate result is that the angular velocity of the gear wheel 8 varies between a maximum rotational velocity and a minimum rotational velocity. Sometimes this velocity will be equal to zero, or can even have a negative rotation. At the minimum angular rotational velocity, indicated at FIG. 1,, the large tooth 11a associated with the gear 11 is situated within the gap 10b defined by the missing gear teeth from the periphery of the gear 10. In the attitude shown in FIG. 1, even though the gear 10 is idly rotating upon the idler shaft 9, the gear 11 is not rotating because the gap 10b defined by the missing section of teeth provides no rotative abutment for the tooth 11a. As a result, further rotation of the gear 11, and, of course, of the drive shaft 12, does not take place. As indicated in FIG. 1, the gear 10 is continuing its rotation in a counterclockwise sense but the gear 11 is no longer moved. Further rotation of the gear 11 is prevented by virtue of the fact that the stopping cam, or cog 31 carried at the end of the lever 16 is nested in the groove 17 integral with gear 11 due to the biasing action of the straining spring 30. However, as the gear 10 continues to rotate and the gap 10b rotates away from the area in which the tooth 11a is situated, the next gear tooth on the gear 10 abuts against the tooth 11a and enables positive clockwise rotation of the gear 11 by virtue of the now meshing engagement between the gears 10 and 11. Also, simultaneously, the cam roller 32 is moved upwardly out of the recess 10a onto the cam surface integral with the gear 10 thereby forcing the lever 16 upwardly against the restraint of the spring 30 to cause disengagement of the cam member 31 from the groove 17; i.e., the cam member 31 is lifted out of locking engagement with the groove 17 so that the gear 11 can continue its rotation. Continued rotation of the gear 11, in turn, again imparts rotative movement to the shaft 12 to drive the transporting rollers 13 and 14 by virtue of their intermeshing end gears 23 and 24.

The aforementioned occurs when the gear 10 and the driven gear 11 have completed a single rotation. That is to say, the tooth 11a being situated in the gap 10b defined by the missing teeth on the gear 10 is positively arrested or locked by virtue of the roller 32 being recessed in the recess 10a, which, in turn, enables the lever 16 to move downwardly and move the cam member 31 into locking engagement with the groove 17 so that gear 11 is positively held, or locked, in the stopped position.

While a specific embodiment of the invention has been shown and described in detail to illustrate the application of the inventive principles, it will be understood that the invention may be embodied otherwise without departing from such principles.

What is claimed is:

Drive apparatus comprising: a rotatable driving shaft; a crank gear eccentrically keyed to said driving shaft for rotation therewith; a crank pin keyed to said crank gear and revolved concentrically about said driving shaft as said driving shaft rotates; a stub shaft; an intermediate gear journalled for idling rotation on said stub shaft, said intermediate gear being meshed with said crank gear for rotation thereby; an additional shaft; an additional gear journalled for idling rotation about said additional shaft and meshed with said intermediate gear for rotation thereby; a first partially rotatable link having said crank pin and said stub shaft journalled at respective ends thereof, said stub shaft and said crank pin serving as pivots for said first link; a second partially rotatable link having said additional shaft and said stub shaft journalled at respective ends thereof, said additional shaft and said stub shaft serving as pivots for said second link; an idler gear coupled with said additional gear for rotation therewith, said idler gear including an adjacent cam surface having a recess and having a section of gear teeth missing from said idler gear; a final shaft adapted for rotatably driving a load; a final gear keyed to said final shaft for rotatably driving said final shaft, said final gear meshing with said idler gear for rotation thereby, said final gear including an adjacently situated recessed groove and an enlarged tooth adapted for being moved into said section of missing teeth of said idler gear as said idler gear pivots about said additional shaft due to rotatable movement of said second link; pivoted lever means including a cam roller and a cam member; and spring means for biasing said lever means so that said cam member may become nested in said recessed groove when said cam roller becomes nested in said recess of said idler gear during revolution of said idler gear; said enlarged tooth being reengaged by the teeth of said idler gear after said section of missing teeth has rotatively passed said enlarged tooth to restart rotation of said final gear simultaneously with the cam roller being moved out of said recess in said idler gear's cam surface thereby moving said cam member out of said recessed groove.

References Cited by the Examiner

UNITED STATES PATENTS

| | | | |
|---|---|---|---|
| 1,393,219 | 10/1921 | Hohl | 74—435 |
| 1,461,579 | 7/1923 | Grimes | 74—435 |
| 1,748,390 | 2/1930 | Otto | 74—435 |
| 1,807,889 | 6/1931 | Belin | 74—393 |
| 2,858,719 | 11/1958 | Hautau | 74—84 |

OTHER REFERENCES

Kaplan et al., Cyclic Three-Gear Drives, Machine Design, March 19, 1959, pp. 185–188, 74—394.

DAVID J. WILLIAMOWSKY, *Primary Examiner.*

DON A. WAITE, *Examiner.*

J. A. WONG, *Assistant Examiner.*